April 28, 1964   G. J. VALIQUETTE   3,130,979
WHEELED CARRIAGE
Filed Dec. 21, 1962
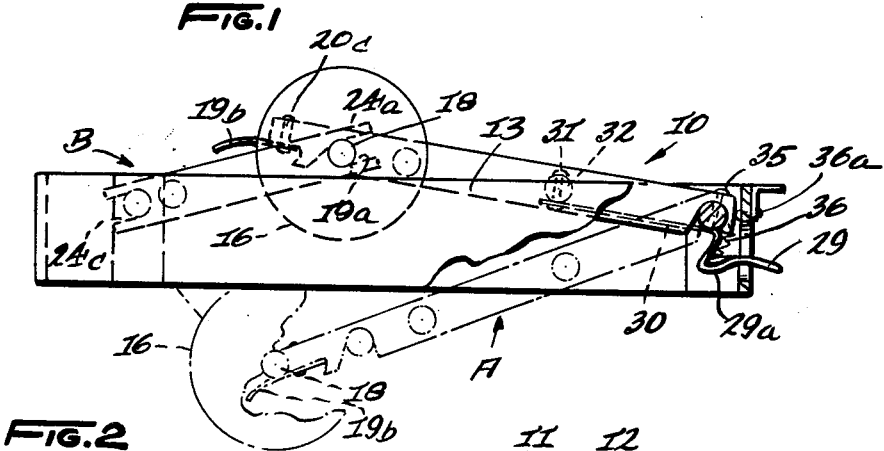
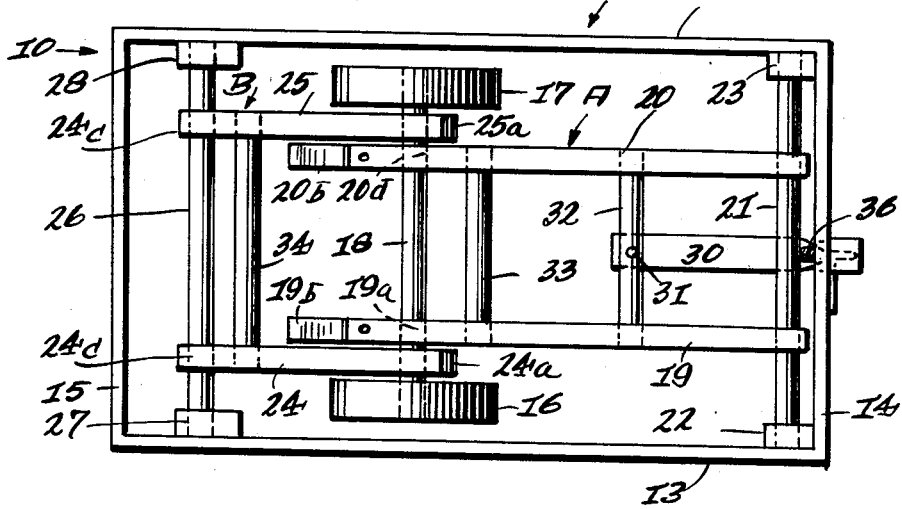
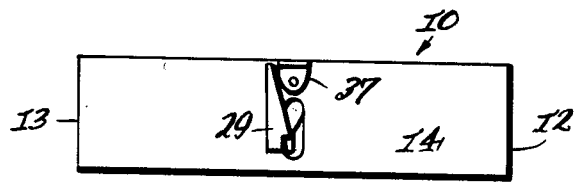
INVENTOR.
GERARD J. VALIQUETTE

United States Patent Office 3,130,979
Patented Apr. 28, 1964

3,130,979
WHEELED CARRIAGE
Gerard J. Valiquette, 54 W. Cole St., Pawtucket, R.I.
Filed Dec. 21, 1962, Ser. No. 246,486
2 Claims. (Cl. 280—43)

The present invention relates to wheel-mounted devices and to wheeled carriages which may be readily installed as accessories to power tool benches, to home furniture, to office equipment etc., and more particularly relates to such devices which have concealed wheels.

One object of this invention is the provision of a transporting and moving means which may be inexpensive to manufacture, easy to operate and safe.

Another object of this invention is the provision of retractable wheels to carriages which may be concealed when the carriage is not in use.

A further object of this invention is the provision of a wheeled carriage which may be readily mounted to power saw benches, to drill press benches and to other home work shop equipment to facilitate the moving about of the equipment in the shop with ease.

An additional object of this invention is the provision of a foot lever to operate the device.

This invention also consists in certain other features of construction and in the combination and arrangement of several parts, to be hereinafter fully described, illustrated in the accompanying drawing and specifically pointed out in the appended claims.

In describing the invention in detail, references will be had to the accompanying drawing where like character numerals denote like or corresponding parts throughout the several views, and in which:

FIG. 1 is a side elevational view showing the embodiment of the present invention;
FIG. 2 is a plan elevational view of FIG. 1; and
FIG. 3 is a side view.

Referring now more particularly to the drawing, the device 10 made in accordance with the present invention is shown in FIG. 1, including, in combination, the main supporting carriage 11 which may be formed preferably out of a pair of longer side frames 12 and 13, and a pair of shorter side frames 14 and 15 inclusive.

A set of two wheels 16 and 17 are mounted upon their common shaft 18, with the latter being supported to rock the elongated lever arms 19 and 20, which by means of the hinge shaft 21, mounted in the bearings 22 and 23 is hingeably supported in the carriage 11 substantially as shown.

From FIG. 2, it may be seen that a second pair of shorter lever arms 24 and 25 is also provided and which by means of the shaft 26, held in the bearings 27 and 28, is allowed to rock freely in the carriage.

In FIG. 1 (which is partially broken away to disclose the mechanism) it may be seen that the foot pedal 29 is by means of the spring extension 30 and the rivet 31 secured to the spacer shaft or rod 33; the latter mounted between the lever arms 19 and 20 substantially as shown. A second spacer shaft 33 is provided to act as a stiffener for the lever arms 19 and 20 to form the bracket A. A third spacer shaft 34 is provided to act as a stiffener for the lever arms 24 and 25 to form the bracket B.

By means of the screw 35 (see FIG. 1) the foot lever 29 is held to the shaft 21, while a coil spring 36 provides the necessary spring tension. One end of the coil spring 36 is held to the foot lever 29 at 29a, while its opposite end 36a is being held to the frame 14. Each of the lever arms 19 and 20 at 19a and 20a may be provided with a notch to permit mounting the shaft 18. Also, each lever arm 19 and 20 is provided with a flat spring 19b and 20b respectively held by means of the rivets 20c. In addition, each of the lever arms 24 and 25 may be provided with a forked extension 24a and 25a respectively to permit mounting the lever arms 24 and 25 to the shaft 18 substantially as shown. In opposite ends of the lever arms 24 and 25 are similarly formed and are made to fit over the shaft 26. In FIG. 3 it can be seen that a latch 37 may be provided to lock the foot lever or pedal 29 in a non-operative position.

It will be now recognized that in actual practice the wheeling device 10 may be operated by lifting the carriage 11 from one end an inch or two, and then to drop the wheels far enough down until they are engaged behind the springs 19b and 20b and are securely locked in place by the lever arms 24 and 25. To make the wheels 16 and 17 disappear, all that is necessary would be to press on the foot lever or pedal 29 until it is locked inoperative on the latch 37, then lift the carriage again until the wheels disengage from the bracket marked A. Upon completion of this operation, the carriage 10 may be lowered slowly to the floor. The foot pedal 29 may be disconnected from the latch 37 so it will be ready to operate again whenever it is needed.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What I claim as new and desire to protect by Letters Patent in the United States is:

1. A convertible carriage comprising, in combination, a rectangular frame, a first bracket hingedly supported on a first transverse shaft at one end of said frame, a wheel shaft carried by said first bracket, a pair of wheels mounted rotatably free on said wheel shaft, said first bracket comprising a pair of long lever arms hinged at one end to said first transverse shaft and supporting said wheel shaft at the opposite end, a removable second bracket hingedly supported on a second transverse shaft at the opposite end of said frame, said second bracket comprising a pair of short lever arms hinged at one end on said second transverse shaft and removably engaging said wheel shaft at the opposite end, said first and second transverse shafts being relatively closer together than the combined length of said long and short lever arms, a notch at each end of said short lever arms for removably engaging said wheel shaft and said second transverse shaft, whereby the wheel shaft may be supported selectively relatively above or below the level of said frame.

2. The combination according to claim 1, including a foot pedal, spring means in said foot pedal to lock said foot pedal in an inoperative position, the operation upon said foot pedal extending said wheels beyond said carriage and means for locking said wheels in an extended position.

References Cited in the file of this patent
UNITED STATES PATENTS

| 723,692 | Litsey | Mar. 24, 1903 |
| 820,274 | Watley | May 8, 1906 |
| 2,484,951 | Kuho | Oct. 18, 1949 |
| 2,908,031 | Millet et al. | Oct. 13, 1959 |

FOREIGN PATENTS

| 487,329 | Italy | Nov. 30, 1953 |